(12) United States Patent
Matsumoto et al.

(10) Patent No.: US 6,768,861 B2
(45) Date of Patent: Jul. 27, 2004

(54) FIBER ARRAY, AND WAVEGUIDE DEVICE

(75) Inventors: Akira Matsumoto, Nagoya (JP); Masashi Fukuyama, Inuyama (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/022,181

(22) Filed: Dec. 13, 2001

(65) Prior Publication Data

US 2002/0076190 A1 Jun. 20, 2002

(30) Foreign Application Priority Data

Dec. 14, 2000 (JP) ........................................ 2000-380900
Nov. 12, 2001 (JP) ........................................ 2001-346559

(51) Int. Cl.[7] .................................................. G02B 6/36
(52) U.S. Cl. ........................ 385/137; 385/114; 385/65; 385/83
(58) Field of Search ............................... 385/115, 114, 385/83, 54, 71, 65, 137

(56) References Cited

U.S. PATENT DOCUMENTS 6,045,269 A * 4/2000 Watanabe et al. ............. 385/59

FOREIGN PATENT DOCUMENTS

| JP | 03155503 A | * | 7/1991 | ............ G02B/6/00 |
| JP | 05264844 A | * | 10/1993 | ............ G02B/6/24 |
| JP | 08114722 A | * | 5/1996 | ............ G02B/6/30 |
| JP | 09090171 A | * | 4/1997 | ............ G02B/6/40 |
| JP | 2000180639 A | * | 6/2000 | ............ G02B/6/08 |
| JP | 2002072016 A | * | 3/2002 | ............ G02B/6/40 |

* cited by examiner

Primary Examiner—Hemang Sanghavi
Assistant Examiner—Scott Alan Knauss
(74) Attorney, Agent, or Firm—Burr & Brown

(57) ABSTRACT

Two ribbon-shaped optical fibers are bare at their leading ends, and bare fibers are adhered and fixed by a V-shaped substrate and a holding plate. The jackets of the ribbon shaped optical fibers are adhered and fixed in the V-shaped substrate by a jacket housing plate. Moreover, dummy fibers on the outermost sides of the bare fibers contact at their portions with the end edges of the V-grooves, and thus they are subject to the displacements of the pitches of the jacket portions as a stress from the outer side. Therefore, no stress is applied to the bare fibers on the inner side for transmitting optical signals.

2 Claims, 4 Drawing Sheets

FIBER ARRAY, AND WAVEGUIDE DEVICE

BACKGROUND OF THE INVENTION

1. Field of the Invention

The present invention relates to a fiber array to be coupled to an optical element. Particularly, it relates to a fiber array, in which bare fibers of a ribbon-shaped optical fiber multi-core line are arrayed in the V-grooves of a V-shaped substrate, and a waveguide device having the fiber array sealed therein.

2. Description of the Related Art

As a result that a higher density of optical fibers disposed in an array was demanded because of an increase in charges for communications, there have been disclosed techniques on the fiber arrays of a normal pitch type, in which a plurality of optical fibers are jointed and formed into a ribbon shape. Further, there have been also disclosed techniques on the fiber arrays of a half pitch type, in which two ribbon-shaped optical fiber multi-core lines 1 and 2 of the normal pitch type are laid one over the other, and in which unjacketed bare fibers are alternately arranged in the V-grooves of a V-shaped substrate thereby to realize the desired high optical fiber density.

In these techniques, it could be said that a loss of optical signals is liable to increase in the ribbon-shaped optical fiber multi-core lines arrayed in the V-grooves of the fiber array. strictly at their outer ports. As the case may be, the bare fibers positioned on the outer sides may be broken. For a first one of these causes, the pitch of the ribbon-shaped optical fiber multi-core lines is standardized to 250 μm, but is enlarged to about 100 μm for the eight cores of an 8-core ribbon or to about 200 μm for a 24-core ribbon due to the occurrence of errors at the jacket forming time. The magnitude of displacement of the pitch of the bare fibers from the pitch of the V-grooves is enlarged especially at the bare fibers housed in the V-grooves on the outermost sides. Therefore, a high bending force is applied to the jacket portions and further to the V-grooves. As a result, when the fibers are adhered and fixed in this state as the fiber array and are placed under a seriously changing temperature environment, the fibers are subjected at their bent portions to a severe stress thereby to cause an increase in the loss of the optical signals or to break the fibers.

Secondly, the pitch of the unjacketed bare fibers is displaced with respect to the pitch of the V-grooves, so that especially the bare fibers housed in the outermost side V-grooves are largely displaced. Therefore, in the assembling work to house the optical fibers in the V-grooves of the fiber array, the bare fibers may be brought to abut against the ends of the V-grooves to cause flaws in the outer circumferences of the optical fibers. Then, although no problem arises just after the assembly, the V-groove end portions cause the increase in the loss of the optical signals and the breakage of the optical fibers after a long period of use. Especially in the case of the fiber array in which the pitch of the V-grooves is as small as 127 μm for the high density, the V-grooves are shallowed by the relation between the diameter and the pitch of the fibers to be mounted and have a narrow opening. Therefore, the problem that the bare fibers to be housed abut against the groove ends of the V-grooves is liable to become serious.

Thirdly, in order to remove the jackets of the ribbon-shaped optical fibers, a dedicated apparatus is used to apply blades vertically to the jacket portions of the optical fibers to peel off the jackets from the upper and lower portions of the optical fibers. If the upper and lower blade edges of the apparatus are inclined although should be in parallel, or if the unjacketing actions are made with the optical fiber being placed not in parallel with the upper and lower blade edges, the blade edge may contact with one optical fiber on the outer side. As a result, flaws in the outer circumference of the optical fibers are often caused, and thus the unjacketing start portion causes the increase in the loss of the optical signals and the breakage of the optical fiber.

Fourthly, moreover, the fibers on the outer sides are the more twisted with respect to the rotation, as caused at the fiber array assembling time and fixed, in a direction θ z for an optical axis in a Z-direction, so that they are always subject to a high load. Fifthly, the entire ribbon is liable to slide in the widthwise direction so that a stress is applied to the bare fibers positioned on the outer sides. These fourth and fifth causes are also liable to invite the increase in the loss of the optical signals and the breakage of the optical fibers.

In the case of the fiber array of the half pitch type, moreover, the bare fibers, which are alternately arranged in one row by laminating two ribbon-shaped multi-core ribbon-shaped optical fibers vertically, are always subject to a vertically bending force. This bending force is more liable to cause the increase in the loss of the optical signals and the breakage of the optical fibers.

SUMMARY OF THE INVENTION

In the present invention according to a first aspect, there is provided a fiber array in which bare fibers of a ribbon-shaped optical fiber multi-core line are arrayed in V-grooves of a V-shaped substrate. In this fiber array, fibers for transmitting no optical signal are disposed on at least the outermost sides of the array of the bare fibers, and also disposed over at least the entire length of the fiber array. Therefore, no optical signal is transmitted to at least the outermost side fibers of the ribbon-shaped optical fiber multi-core line having the optical fibers arrayed in the V-grooves. As a result, the outermost optical fibers absorb the bending stress or the like to be applied to the remaining bare fibers. Even if the bare fibers on the outermost sides are broken in rare cases by the bending force or the like, no optical signal is transmitted. Consequently, the loss in the signals is not increased and the bare fibers on the inner side are not broken. Thus, the fiber array shows excellent stability in the long term.

Here, the phrase of "fibers for transmitting no optical signal" means the fibers which do not transmit the optical signals between the two ends, and covers: the fibers which are not connected with a transmission source of a receiver of the optical signals; the fibers which are connected but do not transmit the optical signals from the transmission source; and the fibers which are connected and transmit the optical signals but which are shielded (as will be called the "dummy fibers"). Moreover, the phrase of "at least the outermost side" means the two optical fibers on the individual two sides, which are positioned on the outermost sides of the fiber arrays of the normal pitch type and the half pitch type, in which multiple fibers are arrayed in one row. Moreover, these optical fibers, i.e., the bare fibers, which are arrayed on the outermost sides in the V-grooves of the V-shaped substrate over at least the entire length of the fiber array and which do not transmit the optical signals, are constructed to include the bare fiber portions and the jackets. Further, these optical fibers are all over at least the entire length of the fiber array. Where the multi-core lines are forty or more or where the V-groove pitch is so small as to increase the bending force, it is preferred that the four optical fibers, as positioned by two individually on the outermost two sides of the fiber array of the multiple cores, are made to pass no signal.

Especially in fiber array of the half pitch type in which two multi-core ribbon-shaped optical fibers are alternately laminated in the vertical direction into one row, the bare fibers, as positioned on at least the outermost sides of the ribbon-side optical fibers arranged on the upper layer, are always subject to the vertical bending force. Therefore, the increase in the loss of the optical signals and the breakage of the fiber array can be prevented in advance by exemplifying those bare fibers by the dummy fibers for transmitting no optical signal. In the case of the fiber array of the half pitch type, on the other hand, it is preferred that the fibers, as positioned on at least the outermost sides, of the ribbon-shaped optical fibers of the upper and lower layers are exemplified by the dummy fibers. At this time, totally at least four optical fibers are the dummy fibers.

In the present invention according to a second aspect, there is provided a waveguide device, in which a fiber array having bare fibers of a ribbon-shaped optical fiber multi-core line arrayed in V-grooves of a V-shaped substrate is optically connected to a waveguide chip and is sealed in a package. In this device, fibers for transmitting no optical signal are disposed on at least the outermost sides of the array of said bare fibers, and disposed from said fiber array to at least the inner face of the package for fixing the jackets. Even in the waveguide device in which the leading ends of the bare fibers but not the jackets are fixed in the V-grooves of the fiber array and in which the jackets are fixed by the package to fix the fiber multi-core line, no optical signal is transmitted to at least the outermost side fibers. Thus, the outermost optical fibers absorb the bending stress or the like to be applied to the remaining bare fibers. Additionally, even if the bare fibers on the outermost sides are broken in rare cases by the severe vibrations or the like of the outside in which the waveguide device is placed, no optical signal has been transmitted. Therefore, the loss of the signals is not increased and so that the fiber array is not broken. Consequently, the device is excellent in a long stability.

The material for the dummy fibers is not especially limited, if it is exemplified by quartz for other optical fibers or a material having a similar shock resistance. The dummy fibers can absorb a shock even if they themselves are broken but so long as they do not come out, thereby to reduce a danger that the bending force arrives to break the inner bare fibers.

DETAILED DESCRIPTION OF THE INVENTION

An embodiment of the present invention will be described in detail with reference to the accompanying drawings.

Figure 1A:
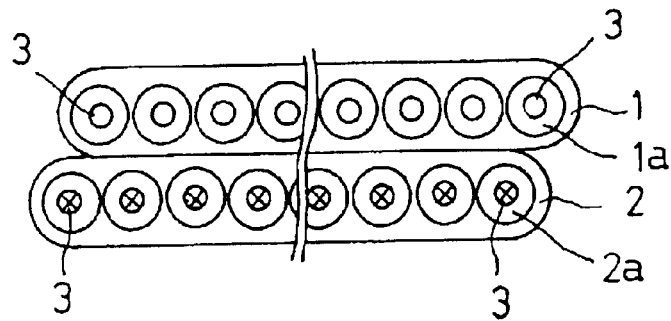
FIGS. 1A, 1B and 1C are explanatory diagrams showing a ribbon-shaped optical fiber multi-core line according to the present invention.
Figure 1B:
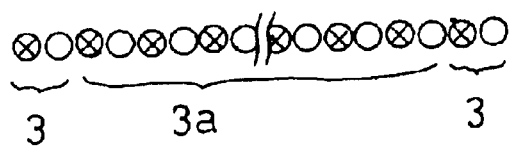
Figure 1C:
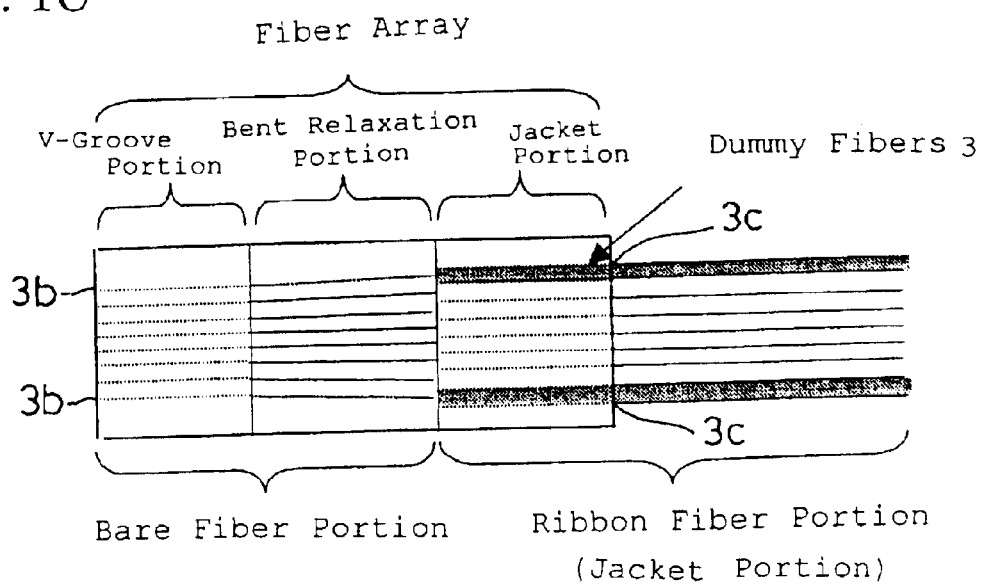
Figure 2B:
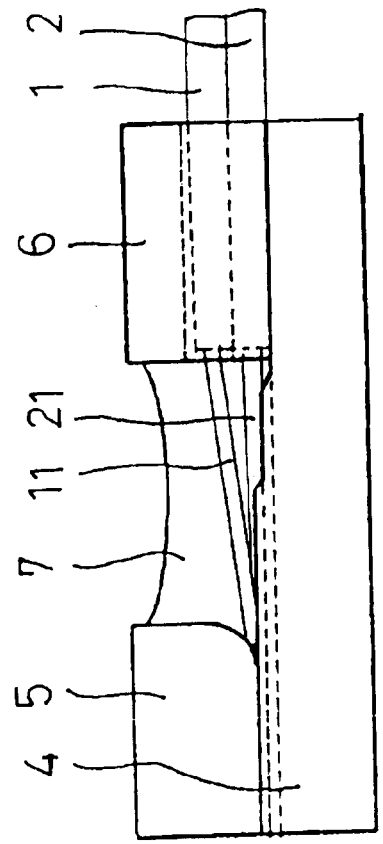
FIGS. 2A, 2B and 2C are explanatory diagrams showing a fiber array.
Figure 2C:
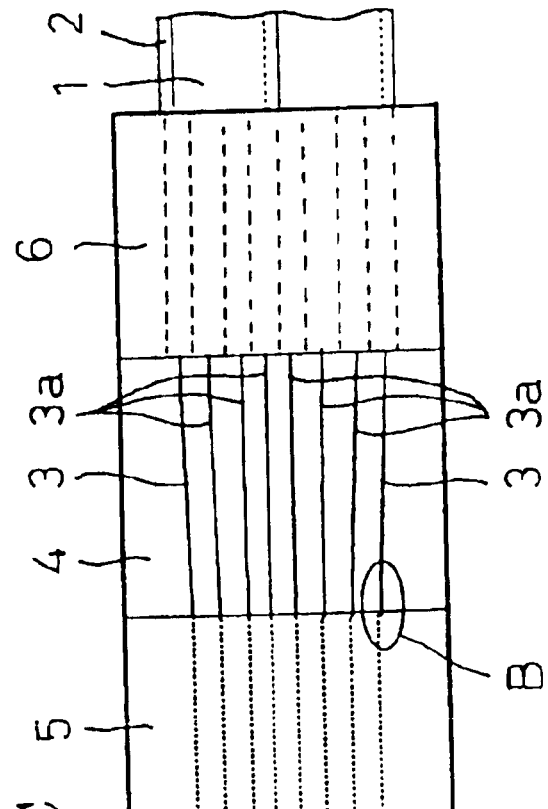
Figure 2A:
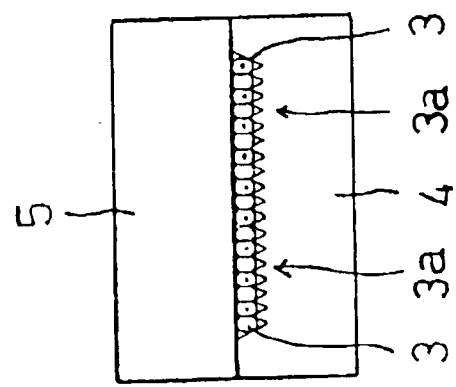

FIGS. 1A to 1C show a ribbon-shaped optical fiber multi-core line for manufacturing a fiber array of the half pitch type. As shown in FIG. 1A, there are prepared two 12-core ribbon-shaped optical fibers 1 and 2, which are laid one over the other. As shown in FIG. 1B, jackets 1a and 2a are then removed to form a 24-core ribbon-shaped fiber, in which the upper and lower bare fibers are alternately arrayed in one row in the V-grooves of a V-shaped substrate. These 24-core ribbon-shaped fibers are prepared by two to form a fiber array as a 48-core ribbon-shaped fiber, as shown in FIGS. 2A to 2C. In the multi-core line, at least the bare fibers on the outermost side in the array direction and the continuous jacketed fibers are then used as dummy fibers 3 and 3 for transmitting no optical signal. Here, in FIG. 1D, the symbols "x" appearing in the shown fiber cores are designations for discriminating the ribbon-shaped optical fibers 1 and 2 and not designations for the transmission direction.

Moreover, the dummy fibers 3 and 3 are the bare fibers and the ribbon fiber portion which has the fiber array of the entire length in the fiber longitudinal direction at least between end edges 3b and 3c of the fiber array and which is clamped by a jacket housing plate. As shown in FIG. 1C, however, it is needless to say that the dummy fibers 3 and 3 may include the ribbon fiber portion continuing to the outside of the fiber array.

Of FIGS. 2A to 2C presenting three side views of the fiber array according to the present invention: FIG. 2A is a front elevation; FIG. 2B is a side elevation; and FIG. 2C is a top plan view. Here, the multi-core line having forty eight cores is shown to have a reduced number of cores, because its width is too large.

The two ribbon-shaped optical fibers 1 and 2 are bare at their leading ends, and the bare fibers 11 and 21 are fitted in the V-grooves of a V-Grooved substrate 4 and are adhered and fixed downward by a holding plate 5. Moreover, the jackets of the ribbon-shaped optical fibers 1 and 2 are adhered and fixed in the V shaped substrate 4 by a jacket housing plate 6. Furthermore, the bare fibers 11 and 21, as located at the position of a relaxation portion 7a between the V-shaped substrate 4 and the jacket housing plate 6, are covered with an adhesive 7.

Of these components, the dummy fibers 3 and 3 on the outermost sides of the bare fibers 11 and 21 contact at their portions, as enclosed by an ellipse B, with the end edges of the V-grooves. Thus, they are subject to the displacements of the pitches of the jacket portions as a stress from the outer side. Therefore, no stress is applied to the bare fibers on the inner side for transmitting optical signals. Even if the dummy fibers 3 should be broken by a high stress, moreover, the whole stress is not applied to the fibers located just inside of the broken dummy fibers and next the outer side, because the bare portions are covered and fixed by the adhesive 7. As a result, the stress is dispersed by the adhesive into small ones so that a possibility of causing a problem is drastically lowered.

Figure 3:
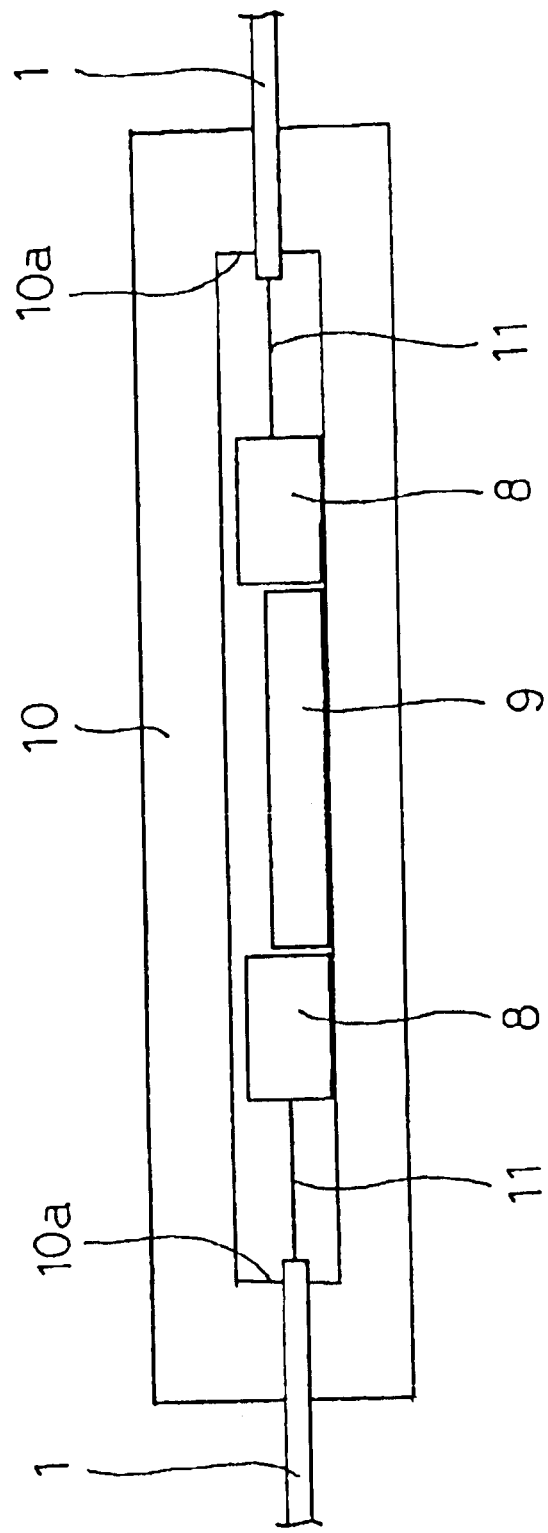
FIG. 3 is an explanatory diagram showing a waveguide device.

FIG. 3 is a side elevation of a waveguide device according to the present invention.

A waveguide device 20 is prepared by connecting a fiber array 8 optically with a waveguide chip 9 and by sealing the connected ones in a package 10. In the fiber array 8, the leading ends of the unjacket bare fibers 11 of the ribbon-shaped optical fiber multi-core line 1 are arrayed in the V-grooves of the V-shaped substrate 4. The package 10 is frequently formed into a box shape having a cover on its upper face, but its sealing means is not limited.

This fiber array 8, in which the leading ends of the unjacket bare fibers 11 of the ribbon-shaped optical fiber multi-core line 1 are arrayed in the V-grooves of the V-shaped substrate 4, does not use the jacket housing plate 6 for adhering and fixing the jackets, unlike the shape shown in FIGS. 2A to 2C. Instead, the jacket of the ribbon-shaped optical fiber multi-core line 1 is fixed by clamping it between the box and the cover of the package, for example.

These dummy fibers to be used can be at least as the outermost ones of the array of the unjacket bare fibers 11 of the ribbon-shaped optical fiber multi-core line 1, and can have a length equal to the fibers used as the inner signal lines. However, in order to exhibit the effects of the present invention, the waveguide device has to be provided with the dummy fibers from the fiber array 8 to at least the inner face 10a of the package for fixing the jackets. Even in the waveguide device in which the leading ends of the bare fibers but not the jackets are fixed in the V-grooves of the fiber array and in which the jackets are fixed by the package to fix the fiber multi-core line, therefore, no optical signal is transmitted to at least the outermost side fibers. Thus, the outermost optical fibers absorb the bending stress or the like to be applied to the remaining bare fibers. Additionally, even if the bare fibers on the outermost sides are broken in rare cases by the severe vibrations or the like of the outside is placed, no optical signal has been transmitted. Therefore, the loss in the signals is not increased and so that the fiber array is not broken. Thus the fiber array is excellent in a long stability.

Figure 4A:
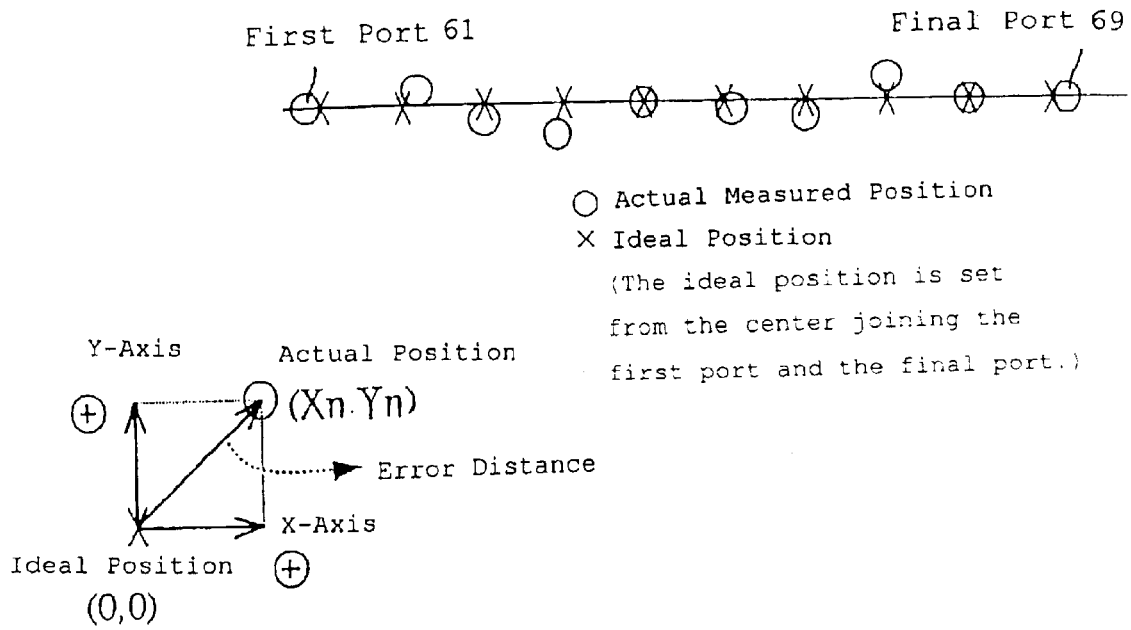
FIGS. 4A and 4B are explanatory diagrams showing a definition of a core position of the fiber array with respect to a waveguide chip.
Figure 4B:
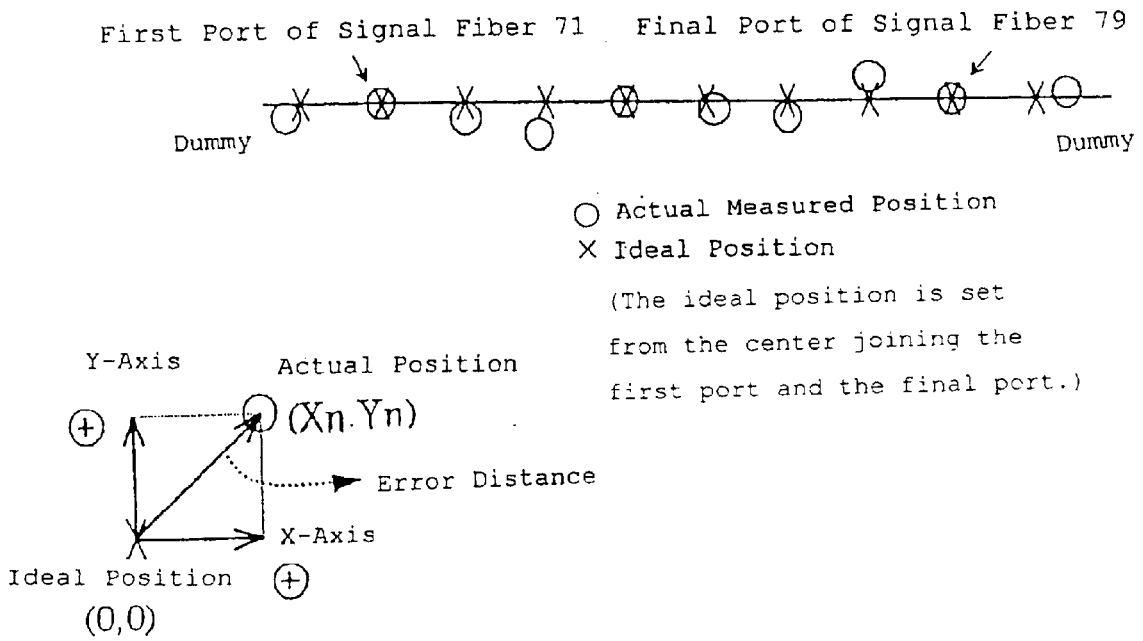

Moreover, when the fiber array is to be coupled to the waveguide chip, this coupling work has been conventionally done so as to avoid the deterioration of the optical signals. That is to say, the coupling work has been done with confirming the position at which the quantity of light to transmit through the cores, at the individual end edges of the fiber array and the waveguide chip, takes maximum. For a first port 61, a final port 69 and the 48-core ribbon fibers shown in FIG. 4A, for example, the ideal positions of the second to forty seventh cores are calculated with reference to the first core and the forty eighth core, so that the error distance is adjusted to bring the actual measured positions to the ideal positions. However, in the present invention shown in FIG. 3, in the case where the 40 ch device is exemplified by totally 48-core ribbon fibers having four dummy fibers on the two sides and totally eight dummy fibers, the positional adjustment is not required since the 1st to 4th cores and the 45th to 48th cores are dummy fibers. On the other hand, the ideal positions for the sixth core to the forty third core have to be calculated with reference to their inner fifth and forty fourth cores, and the adjustment has to be made to attain the ideal positions. As a test of the fiber array, the fiber positions are measured with reference to the fifth core and the forty fourth core. In short, as shown in FIG. 4B, the necessary operations are only to measure the fiber positions with reference to a first port 71 and a final port 79, as located on the two ends of the signal fibers having the dummy fibers on the two sides, thereby to raise the working efficiency.

EXAMPLE

The 48-core fiber array, as shown in FIGS. 1A to 1C by omitting the central portion, was subjected to an endurance test according to the bell core standards. This test was conducted for one ribbon fiber having four dummy fibers, i.e., two fibers on the two outer sides, at a temperature condition of −40° C. to 85° C. and for one trial of 1,000 cycles.

The result is that no trouble occurred up to the intermediate 500 cycles. At the time of 1,000 cycles, only the dummy fibers at the outermost positions were broken. In the transmission of the optical signals, there arose none of the troubles such as the increase in the loss of the optical signals or the breakage of the fiber array.

In the present invention according to the first aspect, as has been described hereinbefore, there is provided a fiber array in which bare fibers, as unjacket, of a ribbon-shaped optical fiber multi core line are arrayed in V-grooves of a V-shaped substrate. Dummy fibers are disposed on at least the outermost sides of the array of said bare fibers, and disposed over at least the entire length of the fiber array. Therefore, no optical signal is transmitted to at least the outermost side fibers of the ribbon-shaped optical fiber multi-core line having the optical fibers arrayed in the V-grooves. As a result, the outermost optical fibers absorb the bending stress or the like to be applied to the remaining bare fibers. Even if the bare fibers on the outermost sides are broken in rare cases by the bending force or the like, no optical signal is transmitted so that its loss is not increased. Consequently, the bare fibers on the inner side are not broken, and thus the device is excellent in a long stability.

In the present invention according to the first aspect, as has been described hereinbefore, there is provided a fiber array in which bare fibers of a ribbon-shaped optical fiber multi-core line are arrayed in V-grooves of a V-shaped substrate. Dummy fibers are disposed on at least the outermost sides of the array of said bare fibers, and disposed over at least the entire length of the fiber array. Therefore, no optical signal is transmitted to at least the outermost side fibers of the ribbon-shaped optical fiber multi-core line having the optical fibers arrayed in the V-grooves. As a result, the outermost optical fibers absorb the bending stress or the like to be applied to the remaining bare fibers. Even if the bare fibers on the outermost sides are broken in rare cases by the bending force or the like. no optical signal is transmitted so that its loss is not increased. Consequently, the bare fibers on the inner side are not broken. and thus the device is excellent in a long stability.

What is claimed is:

1. A fiber array comprising bare and jacketed optical fiber sections for housing an array of bare and jacketed portions of first and second optical fibers of a ribbon-shaped optical fiber multi-core line, said bare optical fiber section comprising V-grooves in a V-grooved substrate, said V-grooves receiving said bare portions of said first and second optical fibers, wherein said first optical fibers transmit optical signals, and said second optical fibers are dummy fibers, and are disposed on at least the outermost sides of the array of said first and second optical fibers, and disposed over at least the entire length of the fiber array.

2. A waveguide device comprising a fiber array comprising bare and jacketed optical fiber sections for housing an array of bare and jacketed portions of first and second optical fibers of a ribbon-shaped optical fiber multi-core line, said bare optical fiber section comprising V-grooves in a V-grooved substrate, said V-grooves receiving said bare portions of said first and second optical fibers, said first and second optical fibers being optically connected to a waveguide chip and sealed in a package, wherein said first optical fibers transmit optical signals, and said second optical fibers are dummy fibers and are disposed on at least the outermost sides of the array of said first and second optical fibers, and disposed from said fiber array to at least the interface of the package for fixing the first and second optical fibers.

* * * * *